United States Patent [19]
Frank

[11] Patent Number: 6,058,184
[45] Date of Patent: *May 2, 2000

[54] SPEAKER UNIT WITH BOOM MICROPHONE

[75] Inventor: Christopher L. Frank, Oakland, Calif.

[73] Assignees: Sony Corporation of Japan, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/992,032

[22] Filed: Dec. 17, 1997

[51] Int. Cl.⁷ ................................................ H04M 1/00
[52] U.S. Cl. ........................ 379/420; 379/454; 379/446; 379/455
[58] Field of Search ................... 379/420, 447, 379/454, 455, 446; 455/90, 575

[56] References Cited

U.S. PATENT DOCUMENTS

| | | | |
|---|---|---|---|
| 5,588,041 | 12/1996 | Meyer et al. | 379/420 |
| 5,642,402 | 6/1997 | Vilmi et al. | 379/420 |
| 5,749,057 | 5/1998 | Takagi | 379/420 |

FOREIGN PATENT DOCUMENTS

| | | | |
|---|---|---|---|
| 0 663 749 A1 | 7/1995 | European Pat. Off. | H04M 1/60 |
| 2 296 157 | 6/1996 | United Kingdom | H04M 1/02 |
| 2 304 487 | 3/1997 | United Kingdom | H04M 1/02 |
| WO 94/22234 | 9/1994 | WIPO | H04B 1/38 |

*Primary Examiner*—Jack Chiang
*Attorney, Agent, or Firm*—Wagner, Murabito & Hao LLP

[57] ABSTRACT

A hands-free adapter for a telephone is disclosed. The hands-free adapter includes a housing, a speaker and a microphone that may be electrically coupled to a telephone. The hands-free adapter couples to a cigarette lighter receptacle of a vehicle. This provides power to operate the speaker and the microphone. In addition, power is coupled to the telephone for operating the telephone and charging the telephones batteries. The hands-free adapter also includes an articulating cable for positioning the speaker and the microphone near a user. The microphone is disposed within a boom which is pivotally coupled to the housing such that the boom may be moved from a retracted position to a fully extended position. The microphone is automatically activated as it is moved out of the retracted position and is automatically deactivated as it is moved back into the retracted position.

16 Claims, 8 Drawing Sheets

SPEAKER UNIT WITH BOOM MICROPHONE

TECHNICAL FIELD

This invention relates to the field of communication devices. More particularly, the present invention relates to a speaker unit with a boom microphone for use with a telephone.

BACKGROUND ART

Early cellular telephones typically had a two-piece design which included a cradle and a handset connected to the cradle. Most of the electronics of these early cellular telephones was disposed in the cradle.

As cellular telephones developed over the years, their size has steadily decreased. This has been partly due to the integration of many of the telephones electronic functions into semiconductor devices such as digital signal processors specifically designed to process the electrical operations of a cellular telephone. In addition, smaller, more powerful batteries have been developed. This has allowed cellular telephone makers to adopt one piece designs. In these one piece designs, all of the functions of the handset and the housing are integrated into a one-piece hand held unit.

Cellular telephones are typically used extensively within vehicles such as cars and trucks. Cradles for newer one-piece telephones typically attach to the vehicle and provide a secure receptacle to hold the telephone when it is not in use. Because all of the functions are integrated into the telephone itself, there are no electronic components disposed within the cradle. Furthermore, there is typically no electrical connection between the cradle and the telephone as was required with older two piece designs.

Prior art cradles typically include latching mechanisms in order to hold the telephone securely in the cradle. The latching mechanism holds the telephone tightly in place, thereby assuring that the telephone will not fall out of the cradle. In order to use the telephone while in the vehicle, the telephone must first be removed from the cradle. However, prior art cradles typically include one or more buttons which must be pressed in order to release the telephone. Thus, in order to remove the telephone from the cradle, the user must press the buttons and lift the telephone out of the cradle. These buttons are relatively small and are located on opposite sides of the cradle. This requires two hands, one hand to press the two buttons and one hand to lift up the telephone. In addition, the user must look down to see the location of the two buttons in order to press them.

After pressing the buttons, the user must then lift the telephone out of the cradle to operate the telephone. This is difficult and time consuming, particularly when the phone is ringing and the user is busy operating the vehicle. This makes removal of the telephone difficult if not impossible while the user is operating the vehicle.

The telephone must then be operated. Recent telephone designs have included smaller and smaller telephones. These recent telephone designs have small keyboards which include one or more function keys and small displays. When an incoming call is received, the cellular telephone typically makes a ringing sound. The user typically establishes a cellular connection by pressing one or more function keys while the telephone is ringing. These keys are typically quite small and are difficult to operate quickly without excessive distraction. The telephone must then be placed up to the user's face such that the microphone is near the user's mouth and the speaker is near the user's ear. This requires the user to use one hand to operate the telephone for the duration of the cellular connection. This can be a problem when the user needs both hands. For example, when a user is driving around a corner, he must either turn one-handed which is dangerous or set the phone down.

Recently, some car manufacturers have developed integrated systems which include a microphone attached to the roof of the car. Such systems also deliver the audio portion of the telephone through the speakers of the car stereo system. Because the speakers are typically not close to the driver, road noise and other sounds interfere with the driver's ability to hear the sounds transmitted over the cellular telephone.

In many of these integrated systems, the user must still look down to find the telephone and turn it on. Because the microphone is placed in the roof, the microphone picks up noise from the vibration of the vehicle. Moreover, in many instances, the microphone is not close to the user. This gives poor reception. Because such integrated systems are only compatible with certain types of telephones, the user is required to purchase a compatible telephone. This can be quite expensive, particularly when the user already has a portable cellular telephone, because the user must purchase a second telephone for the vehicle. In addition, because these systems are built into the vehicle, they are typically quite expensive.

Users who operate in different vehicles are also disadvantaged by such integrated systems because they cannot readily move the system from one vehicle to another. Thus, a separate system must be installed in each vehicle.

What is needed is a microphone and speaker system which is easy to operate and which does not interfere with the driver's operation of the vehicle. In particular, a microphone which is conveniently located and which achieves good reception is needed. In addition, a speaker unit which is close to the driver and which delivers quality sound to the user is required. Moreover, a system which is easy to turn on and off is required. Additionally, a system which may be moved from one vehicle to another is needed.

DISCLOSURE OF THE INVENTION

The present invention provides a microphone and speaker system for a cellular telephone wherein the microphone and speaker system is easy to use. The microphone and speaker system of the present invention may be easily installed in a vehicle and attached to a telephone such that one handed operation of the telephone is possible.

A hands-free adapter for a telephone which includes a housing and a boom is disclosed. The hands-free adapter includes logic circuits disposed within the housing. The hands-free adapter also includes a speaker disposed within the housing and a microphone located on one end of the boom. The speaker and the microphone are electrically coupled to the logic circuits. The logic circuits are coupled to a connector which is adapted to connect to a telephone. This allows for electrical signals to be coupled between a telephone and the hands-free adapter.

In one embodiment, the hands-free adapter includes a switch which is activated by the movement of the boom such that the switch is engaged when the boom is rotated. In one embodiment, the boom rotates from a retracted position into an extended position and the switch is engaged when the boom rotates into and out of the retracted position.

In one embodiment, the hands-free adapter includes a power adapter which is electrically coupled to the electrical circuits of the hands-free adapter such that, when the power adapter is coupled to the vehicle, power is applied to the speaker and to the microphone. In one embodiment, the power adapter is inserted into a cigarette lighter receptacle so as to receive power from the vehicle. The cigarette lighter receptacle mechanically supports the hands-free adapter such that it is positioned near the user. The power adapter couples to the housing via an articulating cable which may be bent so as to position the housing as desired. This allows a user to easily position the housing such that it is near the user and such that it is easy to reach.

The hands-free adapter of the present invention allows a user to easily operate a telephone within a vehicle. The hands-free adapter is installed by plugging the power adapter into a cigarette lighter receptacle in the vehicle and plugging the connector into a telephone. When a call comes in the telephone's "ring" is emitted through the speaker of the hands-free adapter. Since the speaker is located near the driver, the "ring" may be easily heard by the driver. If the user desires to receive the call the user simply rotates the boom. As the boom is rotated out of the retracted position, the microphone is activated and the call is received. That is, a cellular link is established between the caller and the user. The user then communicates by talking into the microphone and listening to sounds emitted by the speaker. The user then may "hang up" by rotating the boom back into the retracted position. This disconnects the cellular connection so as to end the call.

The articulating cable is easily manipulated such that the speaker and the microphone is close to the driver. This provides for clear delivery of sound from the speaker to the driver. In addition, the microphone of the present invention readily receives the user's voice. Moreover, the flexible positioning of the housing allows for the hands-free adapter of the present invention to meet the needs of a variety of different drivers (i.e. drivers of various heights and body sizes are accommodated).

Because the user does not have to remove the telephone from the telephone cradle when a call is received, the user does not have to look down to receive a telephone call. In addition, there is no need to place the telephone up to the user's face. Moreover, there is no need to press a specific key in order to establish a cellular connection with an incoming call as is required when using a prior art telephone. Instead, the user simply needs to rotate the boom in order to connect with an incoming caller.

During the call the user does not have to hold a telephone up to their face as is required when using a prior art telephone. This frees up both hands for safe operation of the vehicle. In addition, the hands-free adapter of the present invention may be easily used with different telephones.

Hence, the present invention may be used in different vehicles as it is easy to move from one vehicle to another.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
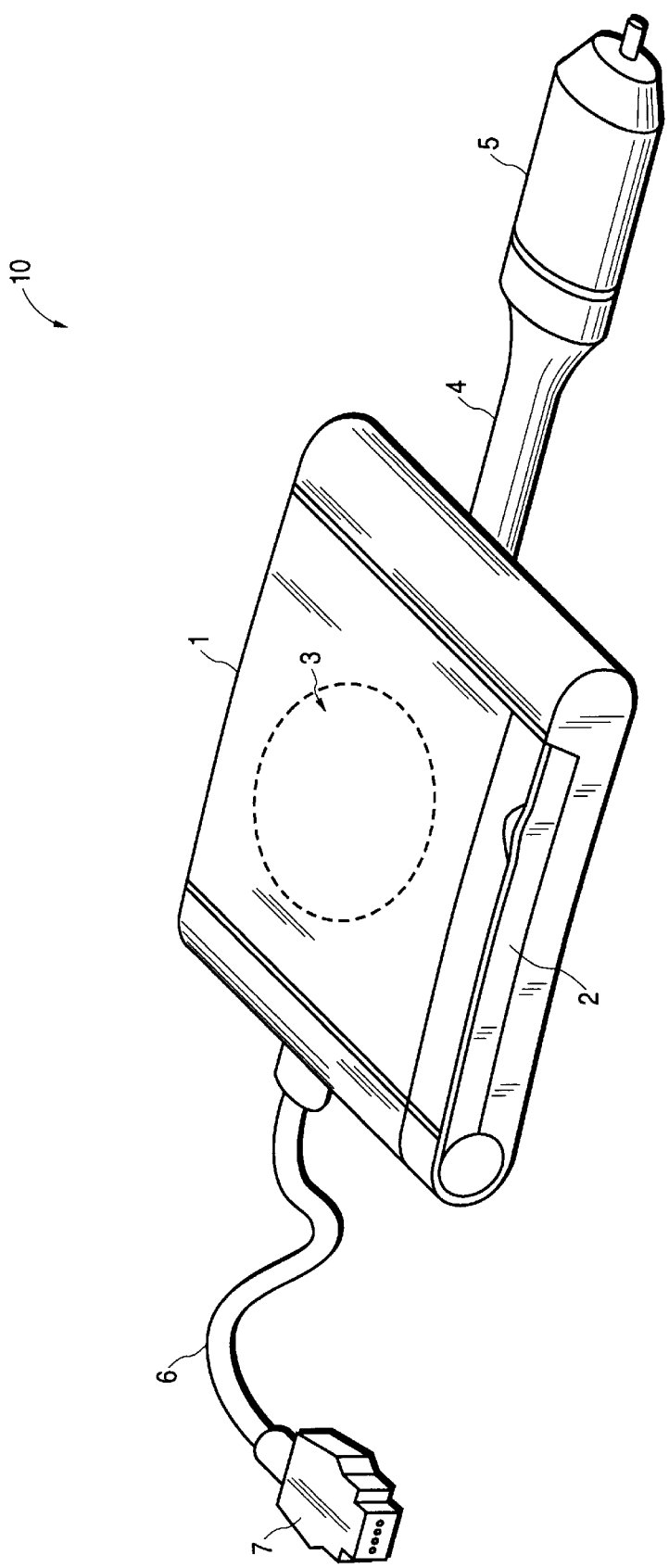
FIG. 1 is a perspective view of a hands-free adapter which includes a boom in the retracted position in accordance with the present invention.

FIG. 1 shows a hands-free adapter 10 having a housing 1 within which a speaker 3 and a boom 2 are disposed. Hands-free adapter 10 also includes a connector 7 which couples to housing 1 via electrical cable 6. Connector 7 is adapted for connection to a telephone. In one embodiment, connector 7 is adapted for connection to a cellular telephone.

With reference again to FIG. 1, hands-free adapter 10 includes a power adapter 5. In one embodiment, power adapter 5 is an electrical connector adapted to fit within a cigarette lighter receptacle of a vehicle. That is, power adapter 5 fits within the cigarette lighter receptacle once the cigarette lighter has been removed.

An articulating cable 4 couples power adapter 5 to housing 1 of FIG. 1. An electrical cable disposed within articulating cable 4 electrically couples power from the vehicle to the electrical circuits of hands-free adapter 10.

Figure 2:
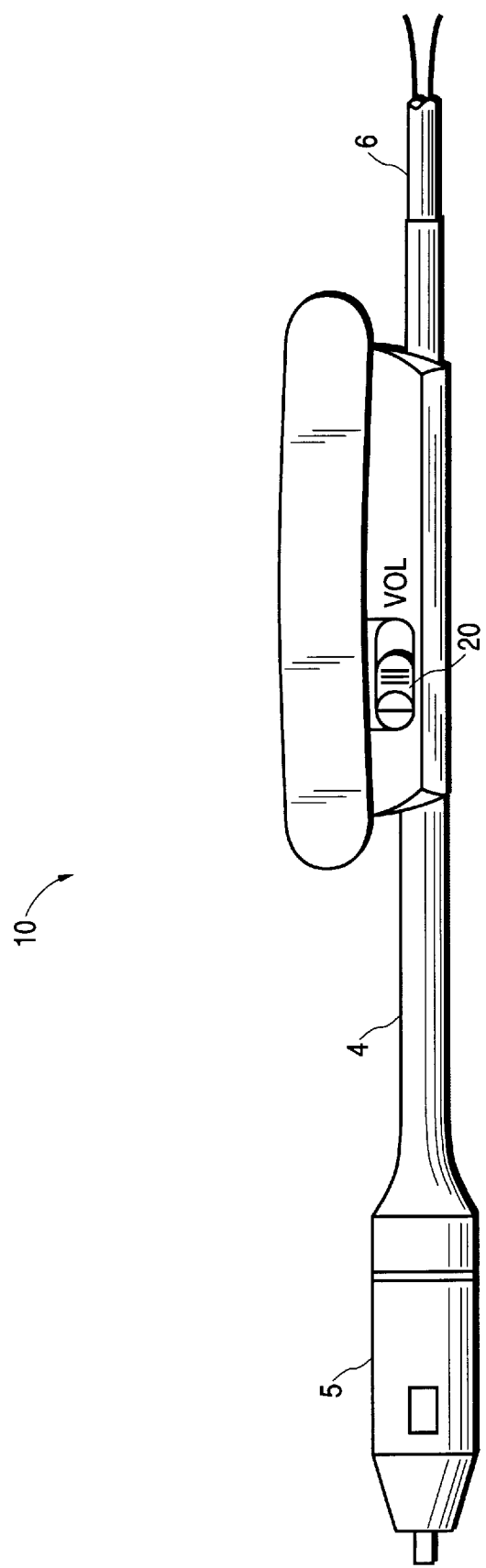
FIG. 2 is a right side view of a hands-free adapter which includes a boom in the retracted position in accordance with the present invention.

With reference now to FIG. 2, a volume control slider 20 is disposed within housing 1. Volume control slider 20 is coupled to the electrical circuits of hands-free adapter 10 and may be slid back and forth so as to regulate the volume of speaker 3.

Figure 3:
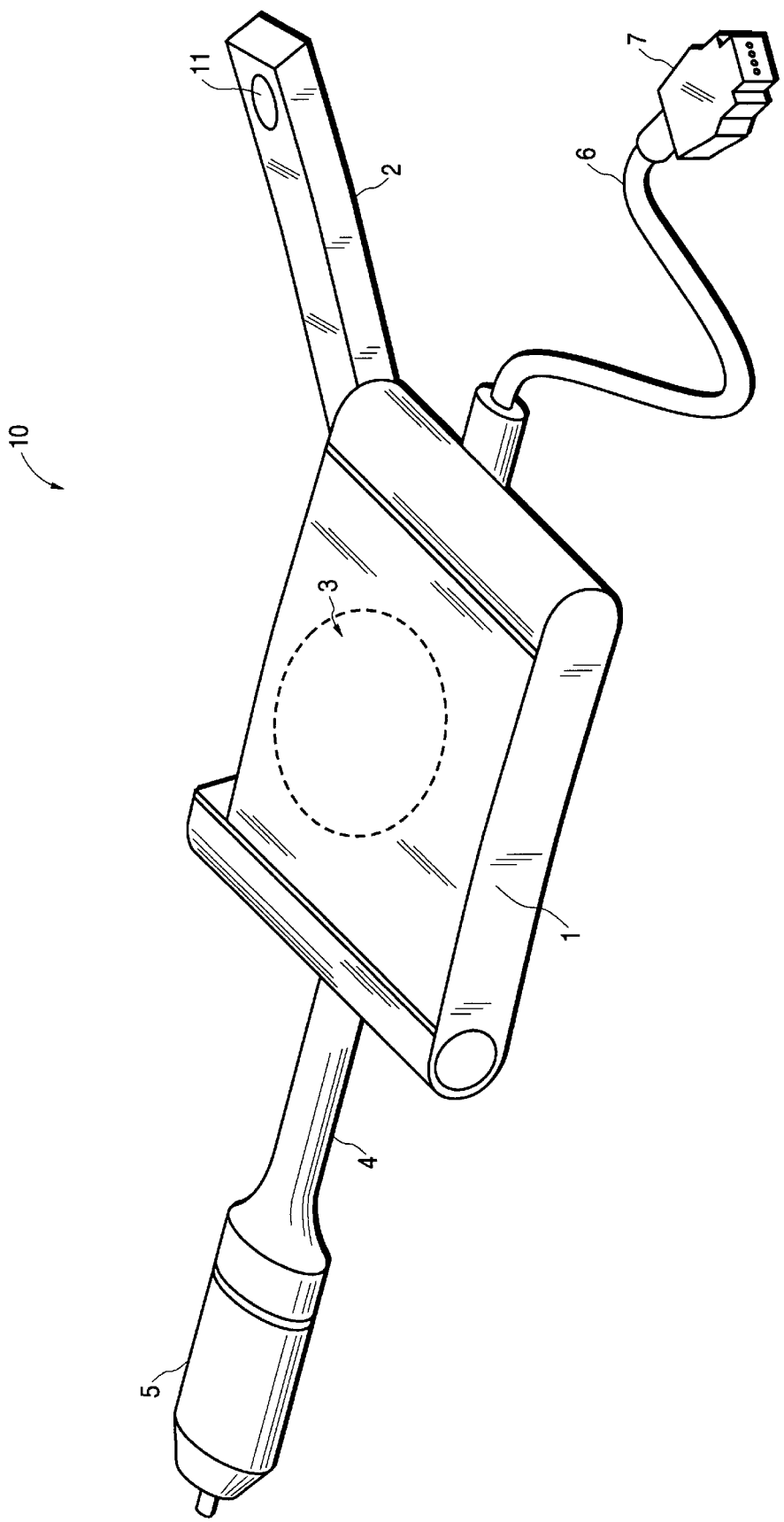
FIG. 3 is a perspective view of a hands-free adapter which includes a boom in the fully extended position in accordance with the present invention.
Figure 4A:
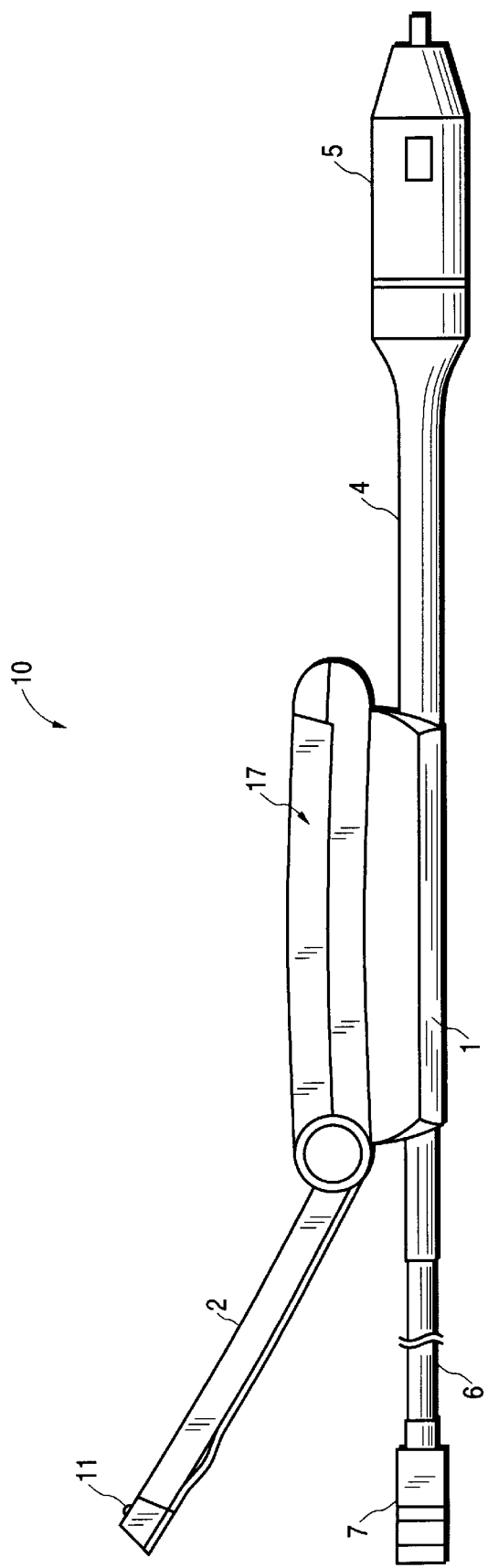
FIG. 4A is a left side view of a hands-free adapter which includes a boom in the fully extended position in accordance with the present invention.
Figure 4B:
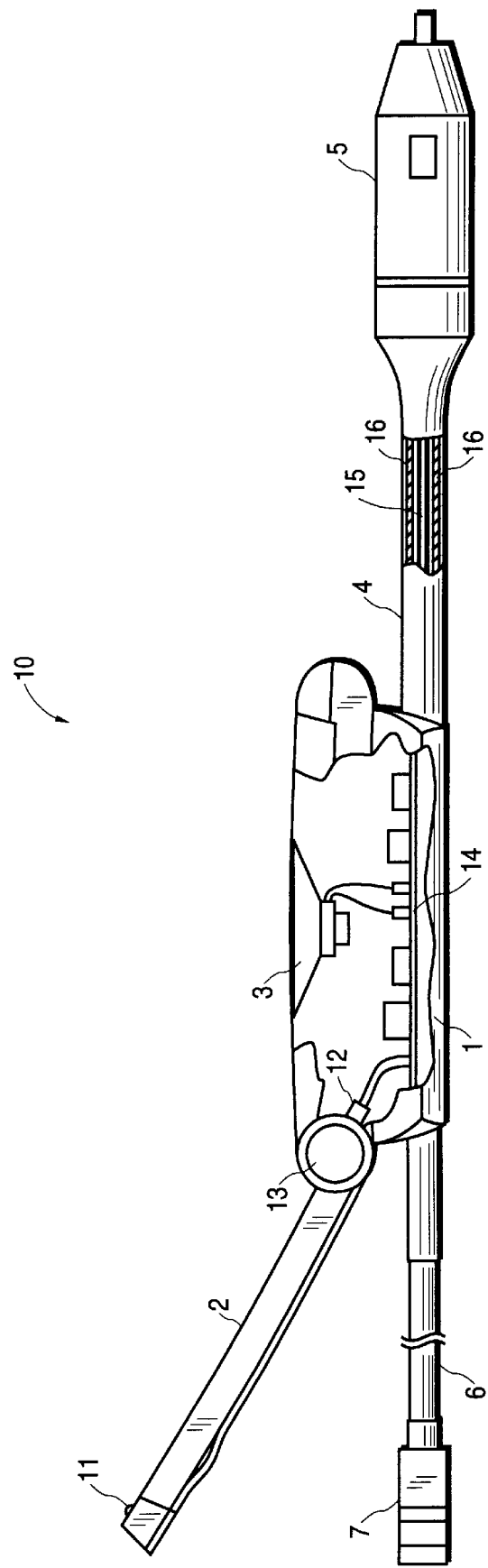
FIG. 4B is a left side cut-away view of a hands-free adapter which includes a boom in the fully extended position in accordance with the present invention.

With reference now to FIGS. 3–4B, boom 2 is pivotally coupled to housing 1 such that it may be pivoted from a retracted position into a fully extended position. In the retracted position, boom 2 fits within receptacle 17 formed in housing 1. Boom 2 is shown in FIGS. 3–4B to be pivoted into the fully extended position. In the fully extended position, a microphone 11 which is disposed on one end of boom 2, is exposed.

Disposed within housing 1 is a circuit board 14, of FIG. 4B, which contains many of the electrical circuits of hands-free adapter 10. Circuit board 14 is electrically connected to power adapter 5 via electrical cable 15 and is electrically coupled to speaker 3 and microphone 11. Circuit board 14 is also electrically connected to connector 7 via electrical cable 6. Switch 12 adjoins cam 13 which rotates with the rotation of boom 2 and senses when boom 2 is in the retracted position. In one embodiment, switch 12 is a mechanical switch that includes a piston which contacts cam 13 such that switch 12 is engaged and disengaged as boom 2 is rotated in and out of the retracted position. Alternatively, any of a number of different types of switch mechanisms may be used to sense when boom 2 is in the retracted position such as, for example, an electrical contact switch.

Continuing with FIG. 4B, articulating cable 4 is shown to include flexible cables 16. In one embodiment flexible cables 16 are metal bars which are semi-rigid such that they may be easily bent but which are rigid enough to maintain housing 1 in a selected position.

Figure 5:
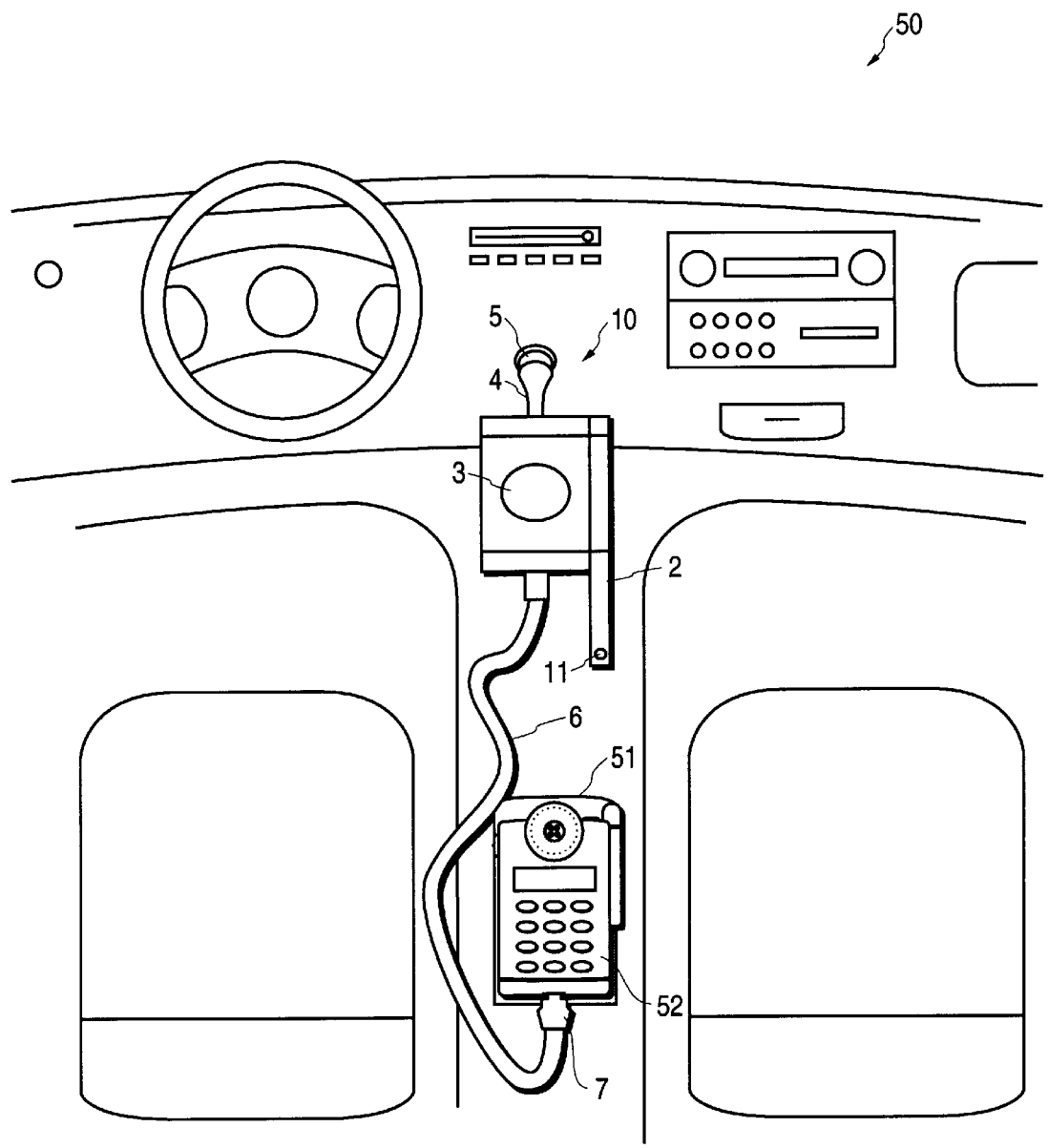
FIG. 5 is a perspective view of a passenger compartment of a vehicle having a hands-free adapter and a telephone disposed therewithin in accordance with the present invention.

With reference now to FIG. 5, hands-free adapter 10 is shown installed into the dashboard of vehicle 50. More specifically, hands-free adapter 10 is shown to be coupled to a cigarette lighter receptacle 53 in the passenger compartment of vehicle 50. Upon coupling power adapter 5 to cigarette lighter receptacle 53, articulating cable 4 securely holds housing 1 such that housing 1 is close to the driver of the vehicle. This allows a driver to hear sound emitted from speaker 3 and to easily input sound into microphone 11.

Continuing with FIG. 5, hands-free adapter 10 is shown to be coupled to telephone 52. More specifically, connector 7 is inserted into a connector receptacle located on the bottom of telephone 52. Telephone 52 is shown to be disposed in telephone cradle 51 which holds telephone 52 securely in place.

Figure 6:
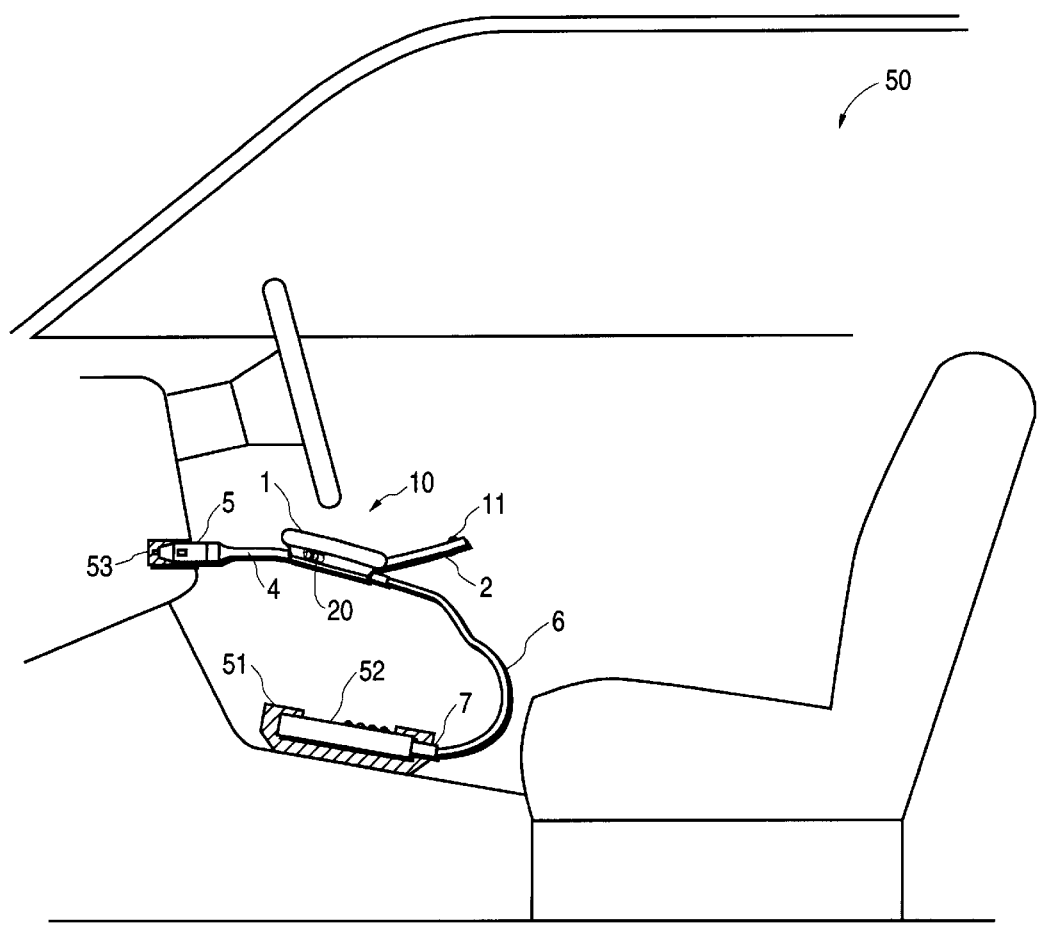
FIG. 6 is a side cut away view of the passenger compartment of a vehicle having a hands-free adapter and a telephone disposed therewithin in accordance with the present invention.

Since microphone 11 of FIG. 6 is activated once boom 2 is moved out of the retracted position, microphone 11 is operable in a wide range of positions up to the fully extended position. In FIG. 6, boom 2 is shown to be rotated into an extended position which is less than the fully extended position so as to accommodate the needs of a specific user. In the embodiment of FIG. 6, articulating cable 6 is shown to be bent so as to conveniently position housing 1 vertically, thereby accommodating the needs of a specific user. The flexibility achieved by adjusting both articulating cable 6 and boom 2 allows for a wide flexibility in positioning microphone 11.

Figure 7:
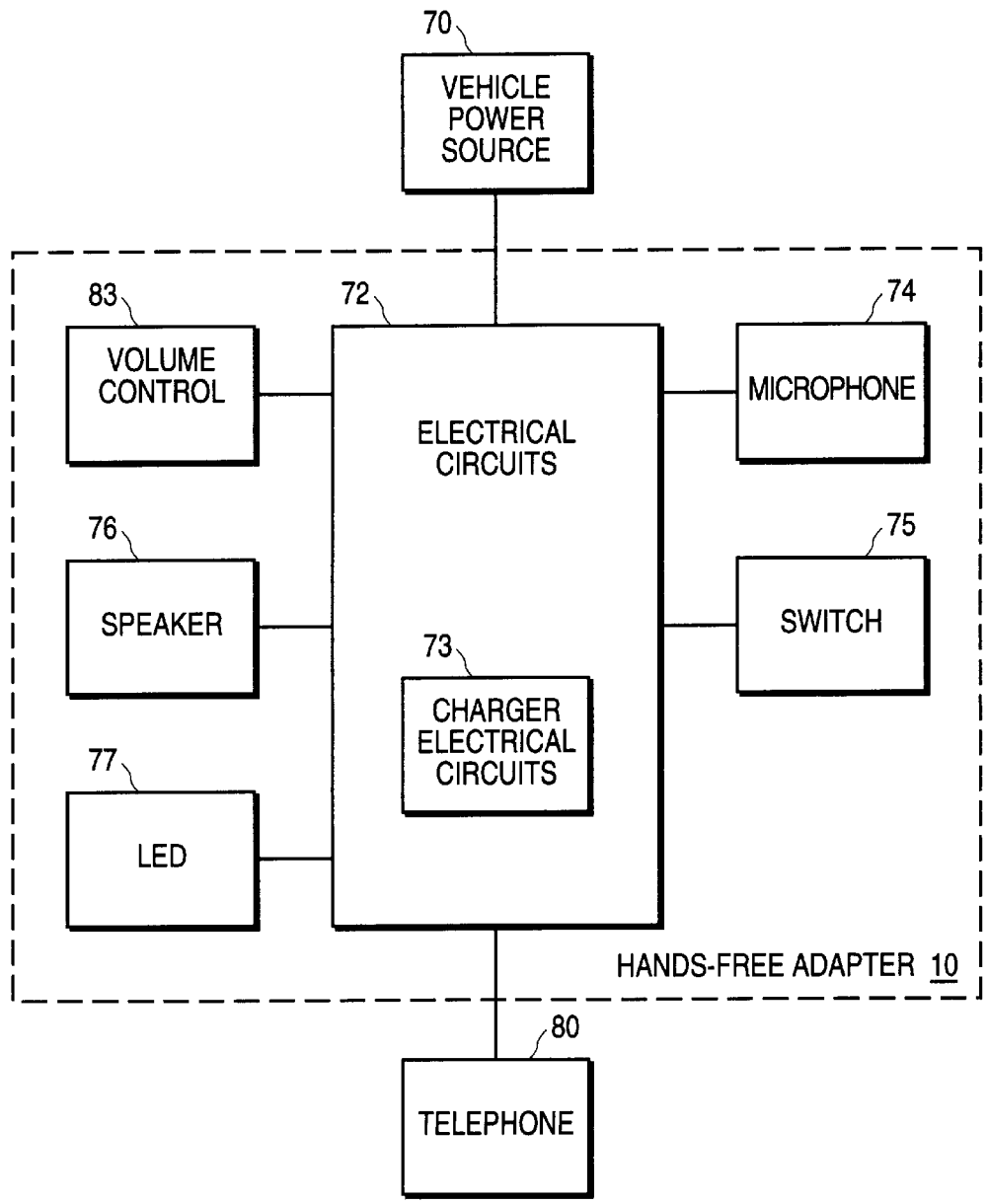
FIG. 7 is a diagram of a hands-free adapter coupled to a telephone and coupled to a vehicle's power source in accordance with the present invention.

In operation, hands free adapter 10 of FIG. 7 is adapted for coupling to a vehicle power source such as vehicle power source 70. In the embodiment shown in FIGS. 1–6, coupling to an automobile's power source is achieved by inserting power adapter 5 into a cigarette lighter receptacle such as cigarette lighter receptacle 53 of FIGS. 5–6. In addition to coupling power to hands-free adapter, cigarette lighter receptacle 53 holds hands-free adapter 10 in place.

Continuing with FIG. 7, hands-free adapter 10 is adapted for connection to a telephone such as telephone 80. Upon coupling a telephone such as telephone 52 of FIGS. 5–6 to hands-free adapter 10, operation of telephone 52 is possible through hands-free adapter 10.

Referring again to FIG. 7, hands-free adapter 10 is shown to include electrical circuits 72 which couple to microphone 74. Switch 75 also is coupled to electrical circuits 72. In one embodiment, switch 75 activates microphone 74 as boom 2 of FIGS. 1–6 is moved out of the retracted position. This allows a user to easily activate microphone 74 by pivoting boom 2. Light emitting diode (LED) 77 is also shown to be coupled to electrical circuits 72. In one embodiment, LED 77 is lighted upon the activation of microphone 74 so as to indicate to a user that microphone 74 is live.

A speaker, shown as speaker 76, is also coupled to electrical circuits 72 of FIG. 7. In one embodiment, speaker 76 is coupled to telephone 80 such that the sounds typically emitted by telephone 80 are emitted by speaker 76. In one embodiment, the sounds emitted by the telephone to indicate that a call is coming through (typically a ringing sound) are emitted through speaker 76. In addition, once a cellular link is established through telephone 80, the received communication is coupled to the user through speaker 76. In the embodiment shown in FIGS. 1–6, speaker 3 couples sound to the user.

With reference again to FIG. 7, electrical circuits 72 include charger electrical circuits 73 for charging telephone 80. This allows a user to charge a telephone by coupling the telephone to hands-free adapter 10. In one embodiment, in addition to charging the battery of telephone 80, charger electrical circuits 73 couple power from vehicle power source 70 to telephone 80 as it is operated.

Also shown to be coupled to electrical circuits 72 is volume control 83. Volume control 83 allows for a user to control the volume level of speaker 76. In the embodiment shown in FIGS. 1–6, volume control slider 20 is operable by a user to control the volume of speaker 3. Though volume control is shown to be achieved by use of a sliding control in the embodiment shown in FIGS. 1–6, alternatively, any of a number of different types of mechanisms could be used to control volume. For example, a rotary knob, a toggle switch, etc. could also be used.

The hands-free adapter of the present invention allows a user to easily operate a telephone within a vehicle. The hands-free adapter is installed by plugging the power adapter of the hands-free adapter into a cigarette lighter receptacle in the vehicle, and plugging the connector into the telephone. When a call comes in the telephone's "ring" is emitted through the speaker of the hands-free adapter. Since the speaker is located near the driver, the "ring" may be easily heard by the driver. If the user desires to receive the call he simply rotates the boom. As the boom is rotated out of the retracted position, the microphone is activated and the call is received. That is, a cellular link is established between the caller and the user. The user then communicates by talking into the microphone and listening to the sounds emitted by the speaker. The user then may "hang up" by rotating the boom back into the retracted position. This disconnects the cellular link.

In addition to use with cellular telephones, the hands-free adapter of the present invention is well suited for use with hand held units used in satellite communication networks and other types of communication networks. For example, the hands-free adapter of the present invention is adapted to connect to a satellite telephone. In addition, the hands-free adapter of the present invention is well adapted for connection to non-cellular radio-telephones.

The hands-free adapter of the present invention is also well suited for use with alternative types of power source connections. For example, the hands-free adapter of the present invention could be plugged into some other type of receptacle which provides a link to the electrical circuits of the vehicle for providing power to the hands-free adapter. In addition, instead of being mechanically supported by a cigarette lighter receptacle, the hands-free adapter of the present invention could be otherwise supported. For example, a dedicated receptacle could be provided for receiving a hands-free adapter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the claims appended hereto and their equivalents.

I claim:

1. A hands-free telephone adapter comprising:
   a housing having a speaker coupled thereto;
   a boom having a first end pivotally coupled to said housing, said boom further having a second end adapted to be extended from said housing;
   a microphone coupled to said boom proximate to said second end of said boom;
   a power adapter electrically coupled to said housing, said power adapter configured for coupling with a vehicle such that electrical power from a vehicle is couplable to said speaker and to said microphone
   an articulating cable coupled on one end to said housing and coupled on the opposite end to said power adapter, said articulating cable semi-rigid and flexible such that said housing can be easily positioned, said articulating cable rigid enough to maintain said housing in a selected position; and
   a telephone connector for coupling said housing to a telephone.

2. The hands-free telephone adapter of claim 1 wherein said boom is movable from a retracted position into an extended position and wherein said microphone is activated when said boom is rotated out of said retracted position.

3. The hands-free telephone adapter of claim 1 further comprising:
   electrical circuits disposed within said housing, said electrical circuits electrically coupled to said speaker and to said microphone.

4. The hands-free telephone adapter of claim 1 further comprising:
   a switch electrically coupled to said boom and to said electrical circuits.

5. The hands-free telephone adapter of claim 1 wherein said articulating cable further includes:
   a plurality of flexible cables.

6. The hands-free telephone adapter of claim 5 wherein said articulating cable further includes:
   an electrical cable, said electrical cable electrically coupled to said power adapter and electrically coupled to said electrical circuits.

7. The hands-free telephone adapter of claim 6 wherein said electrical circuits couple said power adapter to said telephone for charging said telephone.

8. The hands-free telephone adapter of claim 1 wherein said power adapter is adapted to plug into a cigarette lighter receptacle.

9. The hands-free telephone adapter of claim 1 further comprising a volume control disposed in said housing and coupled to said speaker for controlling the volume of said speaker.

10. A hands-free telephone adapter comprising:
    a housing having a speaker coupled thereto;
    a boom having a first end pivotally coupled to said housing, said boom further having a second end adapted to be extended from said housing;
    a microphone coupled to said boom proximate to said second end of said boom;
    means for coupling said housing to a vehicle, said means including a power adapter configured for coupling with a vehicle such that electrical power from a vehicle is couplable to said speaker and to said microphone said means including an articulating cable coupled on one end to said housing and coupled on the opposite end to said power adapter, said articulating cable semi-rigid and flexible such that said housing can be easily positioned, said articulating cable rigid enough to maintain said housing in a selected position; and
    means for connecting said speaker and said microphone to a telephone.

11. The hands-free telephone adapter of claim 10 further comprising:
    means for activating said microphone, said means for activating said microphone including a switch coupled to said boom, said switch operable in response to the movement of said boom.

12. The hands-free telephone adapter of claim 10 wherein said means for connecting said speaker and said microphone to a telephone includes a connector electrically coupled to said speaker and to said microphone, said connector adapted to connect to a telephone.

13. The hands-free telephone adapter of claim 10 wherein said power adapter is adapted to connect to a cigarette lighter receptacle.

14. A method for hands-free operation of a telephone comprising the steps of:
    a) providing a housing having a speaker coupled thereto;
    b) providing a boom having a first end and a second end, said first end pivotally coupled to said housing and said second end adapted to be extended from said housing;
    c) providing a microphone coupled to said boom proximate to said second end of said boom;
    d) providing a power adapter electrically coupled to said housing, said power adapter configured for coupling with a vehicle such that electrical power from a vehicle is couplable to said speaker and to said microphone
    e) providing an articulating cable coupled on one end to said housing and coupled on the opposite end to said power adapter, said articulating cable semi-rigid and flexible such that said housing can be easily positioned, said articulating cable rigid enough to maintain said housing in a selected position; and
    f) providing a telephone connector for coupling said housing to a telephone.

15. The method for hands-free operation of a telephone of claim 14 wherein said boom is movable from a retracted position into an extended position and wherein said microphone is activated when said boom is moved out of said retracted position.

16. The method for hands-free operation of a telephone of claim 15 further comprising the step of:
    providing a switch coupled to said boom for sensing when said boom is moved out of said retracted position.

* * * * *